US007739265B2

(12) United States Patent
Jain et al.

(10) Patent No.: US 7,739,265 B2
(45) Date of Patent: Jun. 15, 2010

(54) DELETING A CONTINUOUS QUERY FROM A DATA STREAM MANAGEMENT SYSTEM CONTINUING TO OPERATE ON OTHER QUERIES

(75) Inventors: Namit Jain, Santa Clara, CA (US); Anand Srinivasan, Karnatka (IN); Shailendra Kumar Mishra, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 326 days.

(21) Appl. No.: 11/874,850

(22) Filed: Oct. 18, 2007

(65) Prior Publication Data

US 2009/0106215 A1    Apr. 23, 2009

(51) Int. Cl.
*G06F 17/30* (2006.01)
(52) U.S. Cl. ......................... 707/713; 707/796
(58) Field of Classification Search ................ 707/2–7, 707/101
See application file for complete search history.

(56) References Cited

U.S. PATENT DOCUMENTS

| 7,403,959 | B2* | 7/2008 | Nishizawa et al. | ........... 707/204 |
| 2006/0230029 | A1* | 10/2006 | Yan | ................. 707/3 |
| 2007/0136254 | A1* | 6/2007 | Choi et al. | ....... 707/3 |
| 2008/0028095 | A1* | 1/2008 | Lang et al. | ................... 709/232 |
| 2008/0046401 | A1* | 2/2008 | Lee et al. | ......................... 707/2 |
| 2009/0043729 | A1* | 2/2009 | Liu et al. | ........................ 707/2 |

OTHER PUBLICATIONS

Shivnath Babu, Continuous Queries Over Data Streams, ACM 2001, pp. 1-16.*
Entire Prosecution History of U.S. Appl. No. 11/873,407, filed Oct. 16, 2007 by Namit Jain et al.
Arasu, A. et al. "Stream: The Stanford Data Stream Management System", Department of Computer Science, Stanford University, 2004, pp. 21.
Chandrasekaran, S. et al. "TelegraphCQ: Continuous Dataflow Processing for an Uncertain World", Proceedings of CIDR 2003, pp. 12.
Chen, J. et al. "NiagaraCQ: A Scalable Continuous Query System for Internet Databases", Proceedings of 2000 ACM SIGMOD, pp. 12.

(Continued)

*Primary Examiner*—Debbie M Le
(74) *Attorney, Agent, or Firm*—Silicon Valley Patent Group LLP; Omkar Suryadevara

(57) ABSTRACT

A first continuous query is deleted from several continuous queries that are being executed, by performing different actions that depend on how resources are shared therebetween. As an example, a second continuous query is deleted if a view is referenced by the first continuous query, and if the view is built on the second continuous query, and if the view is not referenced by any query other than the first continuous query. Such deletion is followed by compiling the second continuous query, followed by updating the view to refer to a newly-compiled version of the second continuous query. As another example, if an operator in the first continuous query is not used by any other query, this operator is de-scheduled from execution, and any exclusively-owned resources are released. Also, data to be read by the operator and data generated by the operator, if present in shared resources, are deleted therefrom.

10 Claims, 7 Drawing Sheets

OTHER PUBLICATIONS

Terry, D.B. et al. "Continuous queries over append-only databases", Proceedings of 1992 ACM SIGMOD, pp. 321-330.

Arasu, A. et al. "The CQL Continuous Query Language: Semantic Foundation and Query Execution", VLDB Journal, vol. 15, Issue 2, Jun. 2006, pp. 32.

Arasu, A. et al. "An Abstract Semantics and Concrete Language for Continuous Queries over Streams and Relations", $9^{th}$ International Workshop on Database programming languages, Sep. 2003, pp. 12.

Babu, S. et al. "Continuous Queries over Data Streams", SIGMOD Record, Sep. 2001, pp. 12.

Munagala, K. et al. "Optimization of Continuous Queries with Shared Expensive Filters", Proceedings of the $26^{th}$ ACM SIGMOD-SIGACT-SIGART symposium on Principles of database systems, believed to be prior to Oct. 17, 2007, pp. 14.

Buza, A. "Extension of CQL over Dynamic Databases", Journal of Universal Computer Science, vol. 12, No. 9, 2006, pp. 12.

Avnur, R. et al. "Eddies: Continuously Adaptive Query Processing", In Proceedings of the 2000 ACM SIGMOD International Conference on Management of Data, Dallas, TX, May 2000, pp. 12.

Avnur, R. et al. "Eddies: Continuously Adaptive Query Processing", slide show, believed to be prior to Oct. 17, 2007, pp. 4.

Madden, S. et al. "Continuously Adaptive Continuous Queries (CACQ) over Streams", SIGMOD, 2002, pp. 6.

Deshpande, A. et al. "Adaptive Query Processing", believed to be prior to Oct. 17, 2007, pp. 27.

Widom, J. et al. "CQL: A Language for Continuous Queries over Streams and Relations", believed to be prior to Oct. 17, 2007, pp. 31.

Motwani, R. et al. "Models and Issues in Data Stream Systems", Proceedings of the $21^{st}$ ACM SIGMOD-SIGACT-SIGART symposium on Principles of database systems, 2002, pp. 26.

Widom, J. et al. "The Stanford Data Stream Management System", believed to be prior to Oct. 17, 2007, pp. 24.

Oracle Application Server 10 g Release 2 and 3, New Features Overview, An Oracle White Paper, Oct. 2005, pp. 48.

Stream Query Repository: Online Auctions, http://www-db.stanford.edu/stream/sqr/onauc.html#queryspecsend , Dec. 2, 2002, pp. 2.

Stream Query Repository: Online Auctions (CQL Queries), http://www-db.stanford.edu/stream/sqr/cql/onauc.html , Dec. 2, 2002, pp. 3.

Entire Prosecution History of U.S. Appl. No. 11/874,197, filed Oct. 17, 2007 by Namit Jain et al.

Entire Prosecution History of U.S. Appl. No. 11/874,202, filed Oct. 17, 2007 by Namit Jain et al.

Entire Prosecution History of U.S. Appl. No. 11/874,896, filed Oct. 18, 2007 by Namit Jain et al.

Entire Prosecution History of U.S. Appl. No. 11/977,439, filed Oct. 20, 2007 by Namit Jain et al.

Entire Prosecution History of U.S. Appl. No. 11/977,437, filed Oct. 20, 2007 by Namit Jain et al.

Entire Prosecution History of U.S. Appl. No. 11/977,440, filed Oct. 20, 2007 by Namit Jain et al.

Entire Prosecution History of U.S. Appl. No. 11/874,197, filed Oct. 16, 2007 by Namit Jain et al.

* cited by examiner

```
Q1: Select B, max(A)
    From    S1 [Rows 50,000]
    Group By B
```

```
Q2: Select Istream(*)
    From    S1 [Rows 40,000], S2 [Range 600 Seconds]
    Where   S1.A = S2.A
```

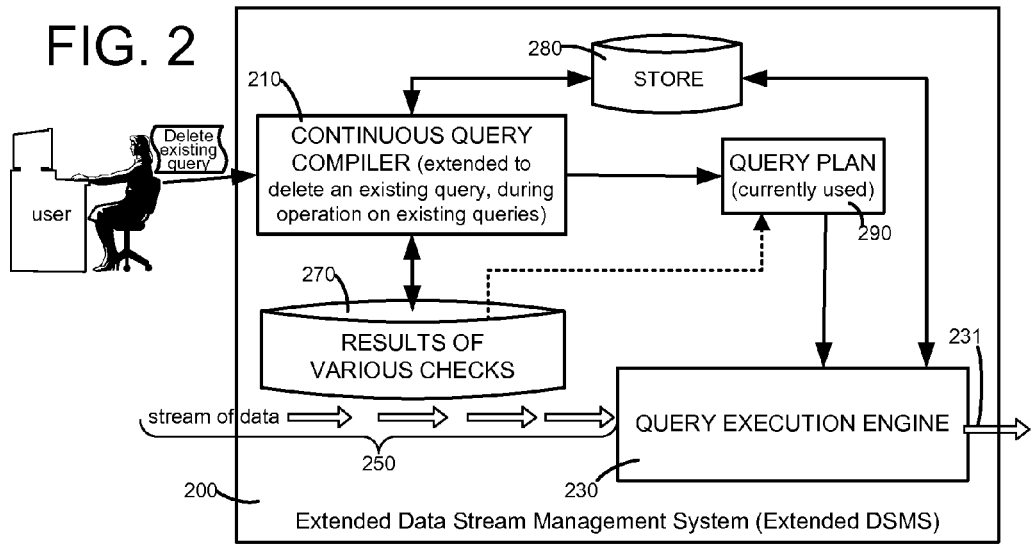
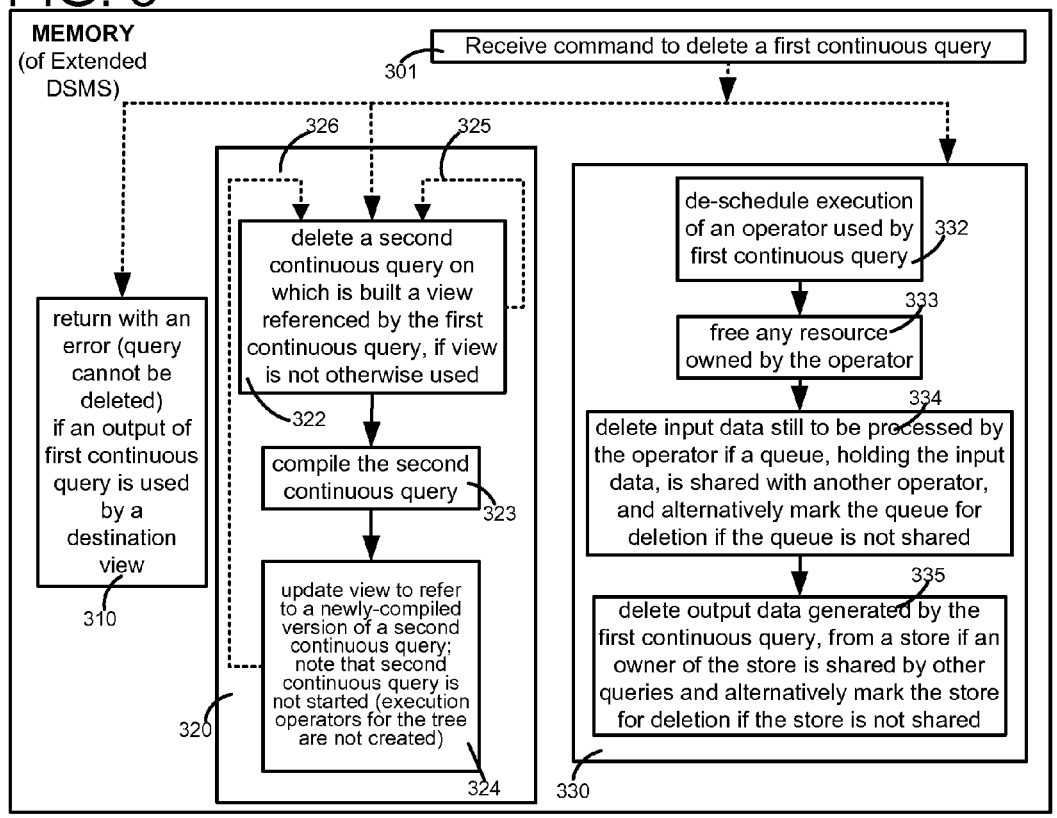

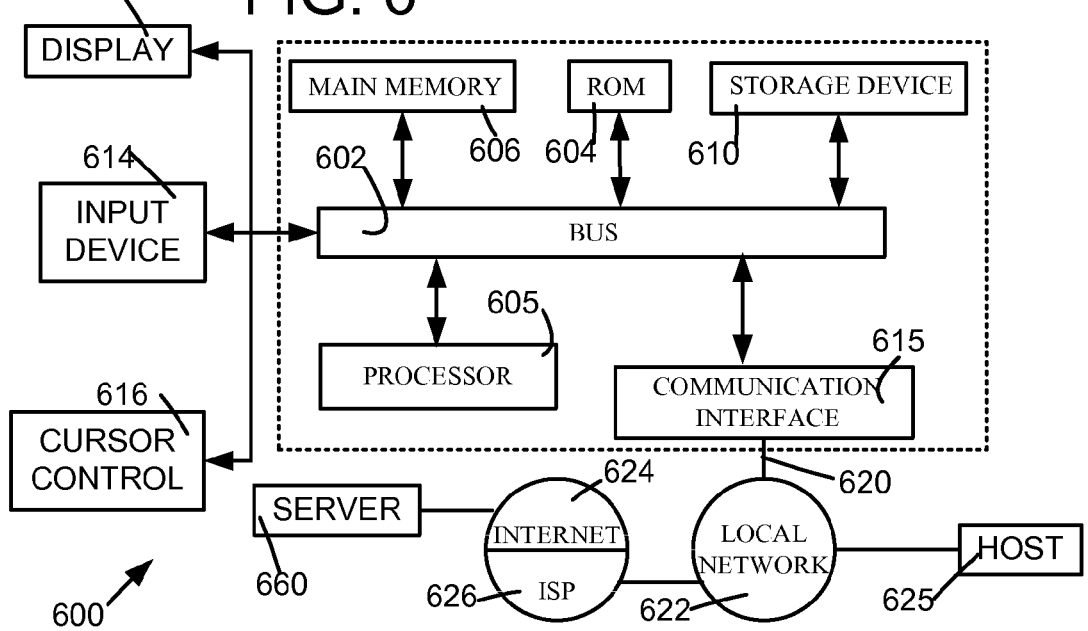

DELETING A CONTINUOUS QUERY FROM A DATA STREAM MANAGEMENT SYSTEM CONTINUING TO OPERATE ON OTHER QUERIES

CROSS-REFERENCE TO RELATED APPLICATIONS

This application is related to and incorporates by reference herein in its entirety, a commonly-owned and concurrently-filed U.S. application Ser. No. 11/874,197 entitled "DYNAMICALLY SHARING A SUBTREE OF OPERATORS IN A DATA STREAM MANAGEMENT SYSTEM OPERATING ON EXISTING QUERIES" by Namit Jain et al.

BACKGROUND

It is well known in the art to process queries over data streams using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive a query (called "continuous query") that is applied to a stream of data that changes over time rather than static data that is typically found stored in a database. Examples of data streams are: real time stock quotes, real time traffic monitoring on highways, and real time packet monitoring on a computer network such as the Internet. FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems, each stream of data can be infinitely long and hence the amount of data is too large to be persisted by a database management system (DBMS) into a database.

As shown in FIG. 1B a prior art DSMS may include a query compiler that receives a query, builds an execution plan which consists of a tree of natively supported operators, and uses it to update a global query plan. The global query plan is used by a runtime engine to identify data from one or more incoming stream(s) that matches a query and based on such identified data to generate output data, in a streaming fashion.

Continuous queries (also called "persistent" queries) are typically registered in a data stream management system (DSMS), and can be expressed in a declarative language that can be parsed by the DSMS. One such language called "continuous query language" or CQL has been developed at Stanford University primarily based on the database query language SQL, by adding support for real-time features, e.g. adding data stream S as new data type based on a series of (possibly infinite) time-stamped tuples. Each tuple s belongs to a common schema for entire data stream S and the time t increases monotonically. Note that such a data stream can contain 0, 1 or more pairs each having the same (i.e. common) time stamp.

Stanford's CQL supports windows on streams (derived from SQL-99) which define "relations" as follows. A relation R is an unordered group of tuples at any time instant t which is denoted as R(t). The CQL relation differs from a relation of a standard relational model used in SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in CQL are based on the concept of a sliding window over a stream: a window that at any point of time contains a historical snapshot of a finite portion of the stream. Syntactically, sliding window operators are specified in CQL using a window specification language, based on SQL-99.

An example to illustrate continuous queries is shown in FIGS. 1C-1E. Specifically, FIG. 1E illustrates a merged STREAM query plan for two continuous queries, Q1 and Q2 over input streams S1 and S2. Query Q1 is shown in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS treat queries as fixed entities and treat event data as an unbounded collection of data elements. This approach has delivered results as they are computed in near real time. However, in most continuous query systems known to the current inventors, the standard approach doesn't allow a continuous query to be deleted dynamically. One reason known to the current inventors is that a query plan is computed at the time of registration of all queries, before the DSMS begins operations on streams of event data. To the knowledge of the current inventors, once the queries have registered and the DSMS begins to process event data, the query plan cannot be changed. The current inventors note that queries can be made to appear as deleted, if a DSMS is programmed to drop the output of queries being deleted, but such appearance is misleading because system load remains unchanged, if deleted queries are still executed.

SUMMARY

A computer is programmed in accordance with the invention to implement a data stream management system (DSMS) that deletes a continuous query ("first continuous query") from among several continuous queries that are being executed therein. An identity of the first continuous query which is to be deleted is typically received in a command (e.g. from a user) in an ad-hoc manner during normal execution of the data stream management system. The first continuous query is then deleted, by performing different actions that depend on how, and whether, resources are shared between the first continuous query and other continuous queries.

As an example, a second continuous query is deleted if a view is referenced by the first continuous query, and if the view is built on the second continuous query, and if the view is not referenced by any query other than the first continuous query. Such deletion is followed by compiling the second continuous query, followed by updating the view to refer to a newly-compiled version of the second continuous query. As another example, if an operator in the first continuous query is not used by any other query, this operator is de-scheduled from execution, and any exclusively-owned resources are released. Also, data to be read by the operator and data generated by the operator, if present in shared resources, are deleted therefrom.

BRIEF DESCRIPTION OF THE DRAWINGS

FIG. 2 illustrates, in an intermediate level diagram, a data stream management system (DSMS) that has been extended in accordance with the invention to support on-line deletion of a continuous query during normal operation, on several continuous queries including the to-be-deleted query.

FIG. 3 illustrates, in a flow chart, methods that are executed by the extended DSMS of FIG. 2, in some embodiments of the invention to obtain a new execution plan by deletion of a continuous query from a current execution plan that is being executed.

FIG. 6 illustrates, in a high level block diagram, hardware included in a computer that may be used to perform the methods of FIGS. 5A and 5B in some embodiments of the invention.

DETAILED DESCRIPTION

A computer is programmed in many embodiments of the invention, to form an extended data stream management system (DSMS) 200 whose continuous query language (CQL) natively supports certain standard SQL keywords, such as a SELECT command having a FROM clause as well as windowing functions required for stream and/or relation operations. Note that even though the same keywords and/or syntax may be used in both SQL and CQL, the semantics are different because SQL operates on stored data in a database whereas CQL operates on transient data in a data stream.

Extended DSMS 200 typically includes a continuous query compiler 210 (FIG. 2) that receives queries from a user. For example, the user may provide to continuous query compiler 210, a command as follows:

Create View $V$ as Select * from $R$ where $A>10$

Figure 1A:
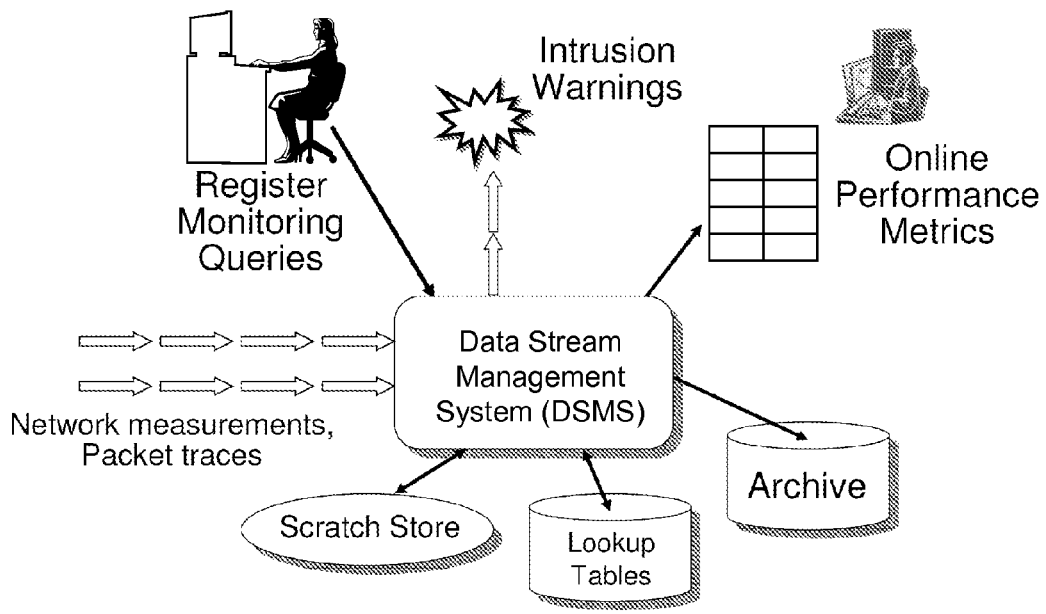
FIGS. 1A and 1B illustrate, in a high level diagram and an intermediate level diagram respectively, a data stream management system of the prior art.
Figure 1B:
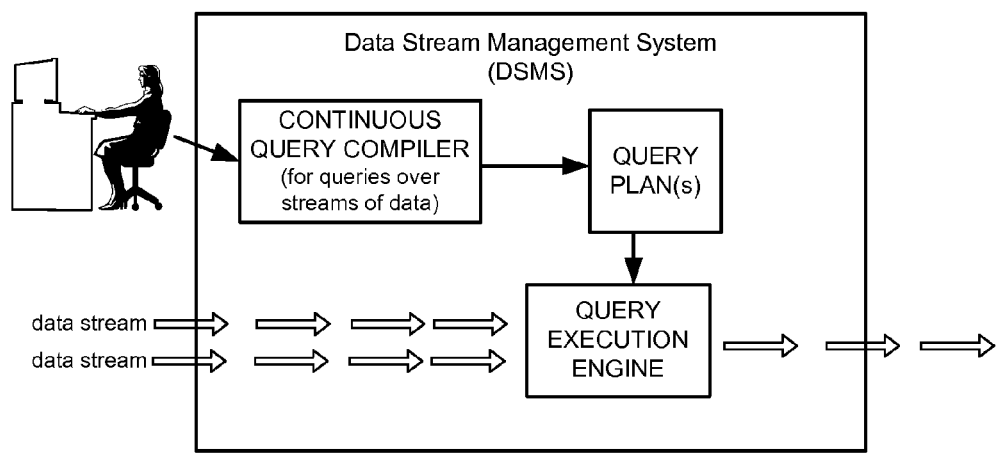
Figures 1C, 1D, 1E:
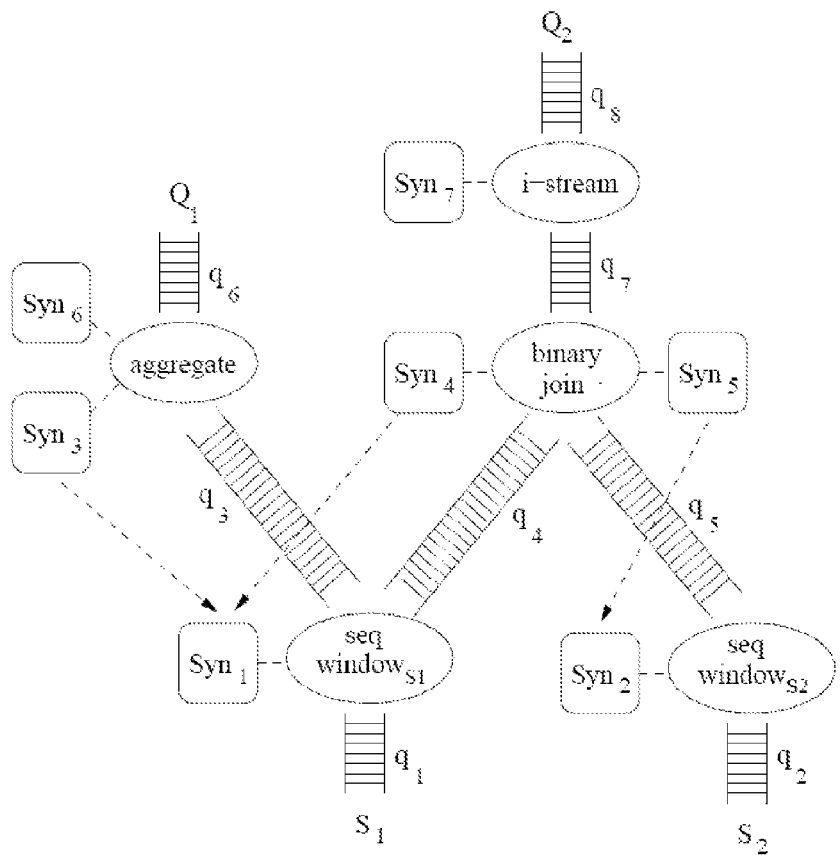
FIGS. 1C and 1D illustrate two queries expressed in a continuous query language (CQL) of the prior art.
FIG. 1E illustrates a query plan of the prior art for the two continuous queries of FIGS. 1C and 1D.
Figure 4A:
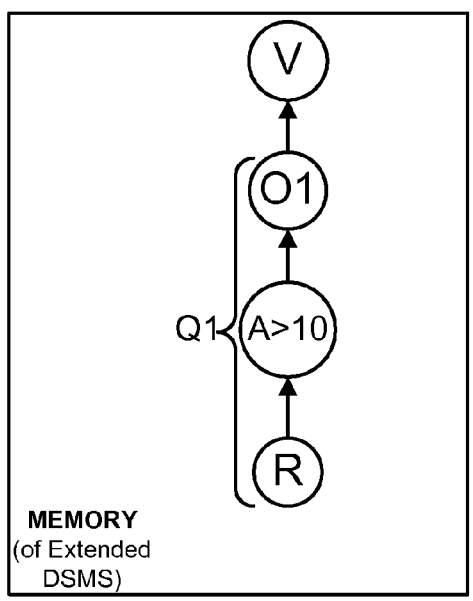
FIGS. 4A and 4B illustrate examples of trees of operators at different instants of time during updating of a current execution plan to add and/or delete a continuous query, in several embodiments of the invention.

In the above command, R is a relation, e.g. the number of chairs in a conference room. Note that a portion of the command which is located after the word "Select" is a query, e.g. identified as Q1. On receipt of such a command, query compiler 210 creates a tree of the type illustrated in FIG. 4A. However, since Q1 is used in a view, continuous query compiler 210 does not start execution of query Q1 at this time. The user may build a query on top of Q1 by providing to query compiler 210, a command as follows:

Select * from $V$ where $A>20$

Figure 4B:
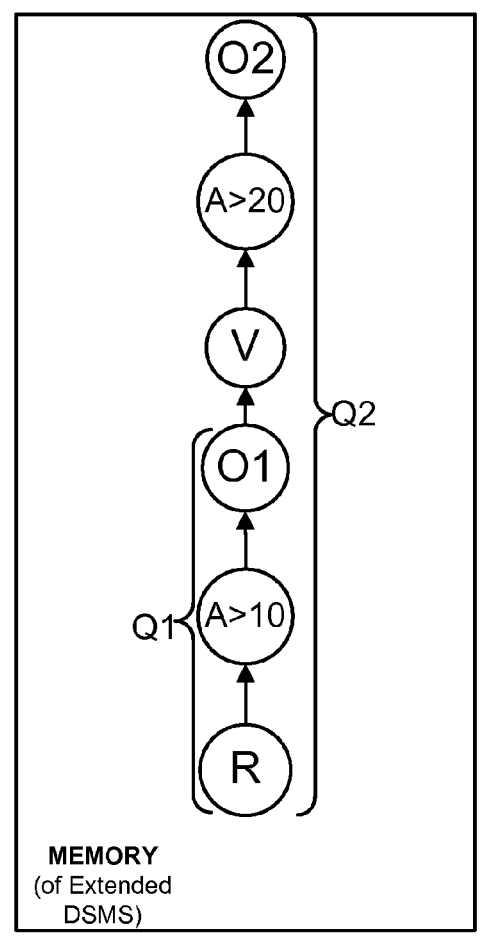

On receipt of this command, e.g. identified as query Q2, query compiler 210 creates a tree of the type illustrated in FIG. 4B. Here, continuous query compiler 210 initiates execution of query Q2 by a query execution engine 230, by adding Q2 to the query plan that is currently being used, in memory 290. Hence, processing of query Q1 is started implicitly, to support processing of query Q2.

In several embodiments of the invention, if query compiler 210 receives a command to delete a query (e.g. from a user), then query compiler 210 responds by dynamically updating a currently-used query plan in memory 290 without interrupting the execution of query execution engine 230. Specifically, as soon as DSMS 200 uses the dynamically updated query plan, a stream 231 that is being output by DSMS 200 is automatically changed to no longer include any data that was previously generated by execution of the deleted query. Hence, a computer system 600 is programmed in some embodiments to respond to a user's deletion of a query by performing one or more of operations 310, 320 and 330 illustrated in FIG. 3, to eventually obtain a new execution plan in memory 290. A deletion command may identify to query compiler 210, an identity of the continuous query which is to be deleted. For example, the user may identify "Q1" as the query to be deleted.

Note that the command to delete a query is received in an ad-hoc manner, during normal execution of extended data stream management system 200 to process a number of queries that have been previously registered therein. Extended DSMS 200 responds to a command for query deletion by performing different actions that depend on how and whether various resources are shared between the query to be deleted and any other continuous queries that are currently being executed. Specifically, extended DSMS 200 may be executing a global query plan which shares not only source operators but also operators at intermediate nodes of an operator tree of the query to be deleted with one or more other queries that are not being deleted, as described in for example, U.S. patent application Ser. No. 11/874,197 which is incorporated by reference, as noted at the beginning of the current patent application.

As an example of such actions, several embodiments check (as per operation 310 in FIG. 3) if there is any view which receives the output of the continuous query to be deleted, i.e. a destination view. If a result of checking is true, then these embodiments return with an error (query cannot be deleted). More specifically, if the query to be deleted was Q1, then query compiler 210 simply returns without affecting its execution because view V is a destination view whose output is used by query Q2 (see FIG. 4B). If the command to delete such a query was issued by a user, then an error may be flagged to notify the user, depending on the embodiment. In such embodiments, if deletion of the continuous query was triggered internally, unrelated to the user, no error is flagged.

As another example, of the actions performed by some embodiments of the invention after receiving the deletion command, a second continuous query which is different from a first continuous query that is identified in the deletion command may be deleted. More specifically, as illustrated by operation 320 (FIG. 3), if a view is referenced by the first continuous query, and if the view is built on the second continuous query, and if the view is not referenced by any query other than the first continuous query, then the second continuous query is deleted. See act 322. In the example discussed above in reference to FIG. 2 the to-be-deleted query is Q2 (FIG. 4B), then it is appropriate to delete query Q1, when query Q1 is executed only to provide its results as input to Q2's operator, namely A>20. Immediately after such deletion, note that there is no record of query Q1 in extended DSMS 200, i.e. the result of such deletion is not the state shown in FIG. 4A wherein a view V is available for use by future queries. Hence, to return extended DSMS 200 to such state, several embodiments perform act 323 by compiling the deleted continuous query e.g. Q1, followed by act 324 to update the view to refer to a newly-compiled version of that continuous query (second continuous query). Note that the second continuous query is not started (the execution operators for the tree are not created).

As yet another example, actions performed in certain embodiments are illustrated by operation 330. Specifically, as per act 332 if an operator of the to-be-deleted query is not used by any other query, then this operator is de-scheduled from execution. In the example discussed above in reference to FIG. 2 if the to-be-deleted query is Q2 (FIG. 4B), then it is appropriate to de-schedule operator A>20, because no other query needs this operator. Additionally, as per act 333, any resources (such as queues and/or stores) that are exclusively owned by the de-scheduled operator are also released.

Also, any data that is waiting to be read by the de-scheduled operator (as per act 334), and any data that has been generated by the de-scheduled operator (as per act 335) are deleted if present in shared resources. In the above-described example, any data from view V that is input to operator A>20 is deleted. Moreover, any data that is waiting to be read by operator O2 is also deleted. Note that deletion of data is performed only when the resources holding such data are shared by other operators that continue to be executed (e.g. to support other existing queries), and otherwise the resources themselves are deleted (if exclusively owned by the de-scheduled operator). Furthermore, any structures (such as pointers) used by the de-scheduled operator to access shared resources are also deleted.

Depending on the embodiment, the extended DSMS 200 may perform operations 310, 320 and 330 in any order relative to one another. Moreover, the acts within a given operation may also be performed in any order relative to one another. For example, acts 332-335 may be performed in an order that is reverse of the order shown in FIG. 3.

Figure 5A:
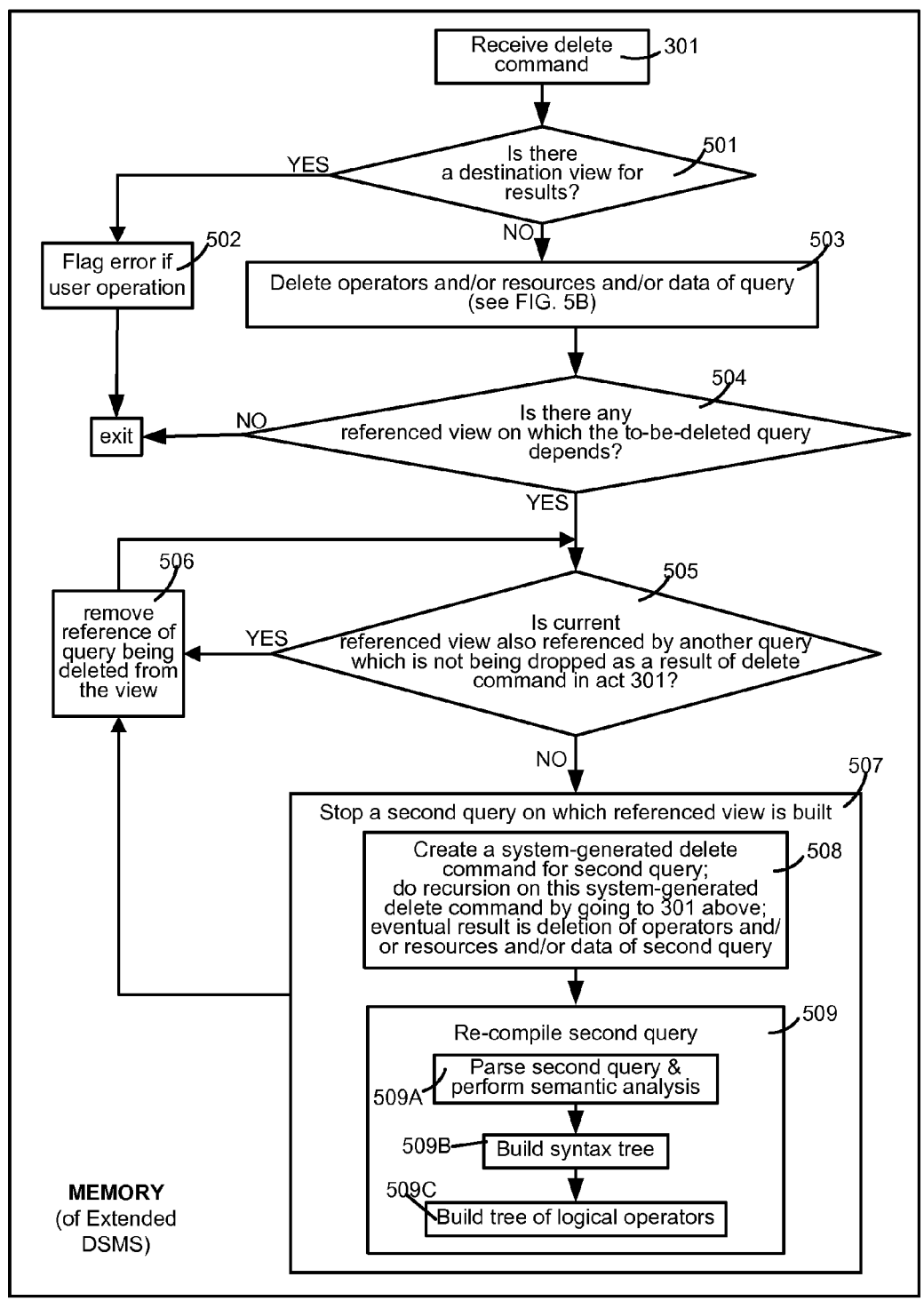
FIGS. 5A and 5B together illustrate, in a flow chart, acts of a method that is performed in some embodiments of the invention, to delete a continuous query

In some embodiments, a computer of extended DSMS 200 is programmed to perform the two methods illustrated in FIGS. 5A and 5B, to generate a new execution plan, as discussed next. Referring to FIG. 5A, in act 301, a delete command is received as discussed above. Next, in act 501 the computer checks if there is a destination view for the results. If the result of checking is yes, then control transfers to act 502. In act 502, the computer flags an error if the user has initiated this operation and thereafter exits. In act 501, if the result of checking is no, then the computer goes to operation 503. In operation 503, the computer deletes one or more operators and/or resources and/or data of the continuous query that is being deleted (that was identified in act 301). A detailed flow chart of the method performed by operation 503 in some illustrative embodiments is shown in FIG. 5B and described below.

On completion of operation 503, the computer goes to act 504 to check if there is any referenced view on which the to-be-deleted query depends. If the result of checking is no, the computer exits. If the result of checking is yes, then the computer goes to act 505. In act 505, the computer checks if the current referenced view is also referenced by another query which is not being dropped as a result of the delete command (received in act 301). If the result of checking in act 505 is yes, then the computer goes to act 506 to remove reference to the query being deleted from the referenced view (if an additional referenced view exists), and then returns to act 505.

If in act 505, the result of checking is no, then the computer goes to act 507. In act 507, the computer stops a second query on which the referenced view is built by performing acts 508 and 509 as follows. In act 508, the computer creates a system-generated delete command for the second query, followed by use of that command to return to act 301 (described above) which results in recursion through a tree for the second query. During this recursive call, various components are deleted as per act 503 (described above) until eventually in act 504 the recursion ends on reaching the leaf node(s) of the tree. Act 508 is followed by re-compiling the second query in act 509. Specifically, in act 509, the computer automatically parses the second query and performs semantic analysis as per act 509A, followed by building of the syntax tree as per act 509B, followed by building a tree of logical operators in act 509C. At the conclusion of act 509C, the second query is ready for starting (i.e. physical operators are not yet created for the second query), i.e. the second query is now in the same state as it was when it was originally added. Note that the re-compilation of the second query in act 507 is not the first time that the second query was compiled, and instead this is a repetition. The repetition is required in order to return the second query to its state before execution of the second query was started to support the first query. After act 507, the computer returns to act 506.

Figure 5B:
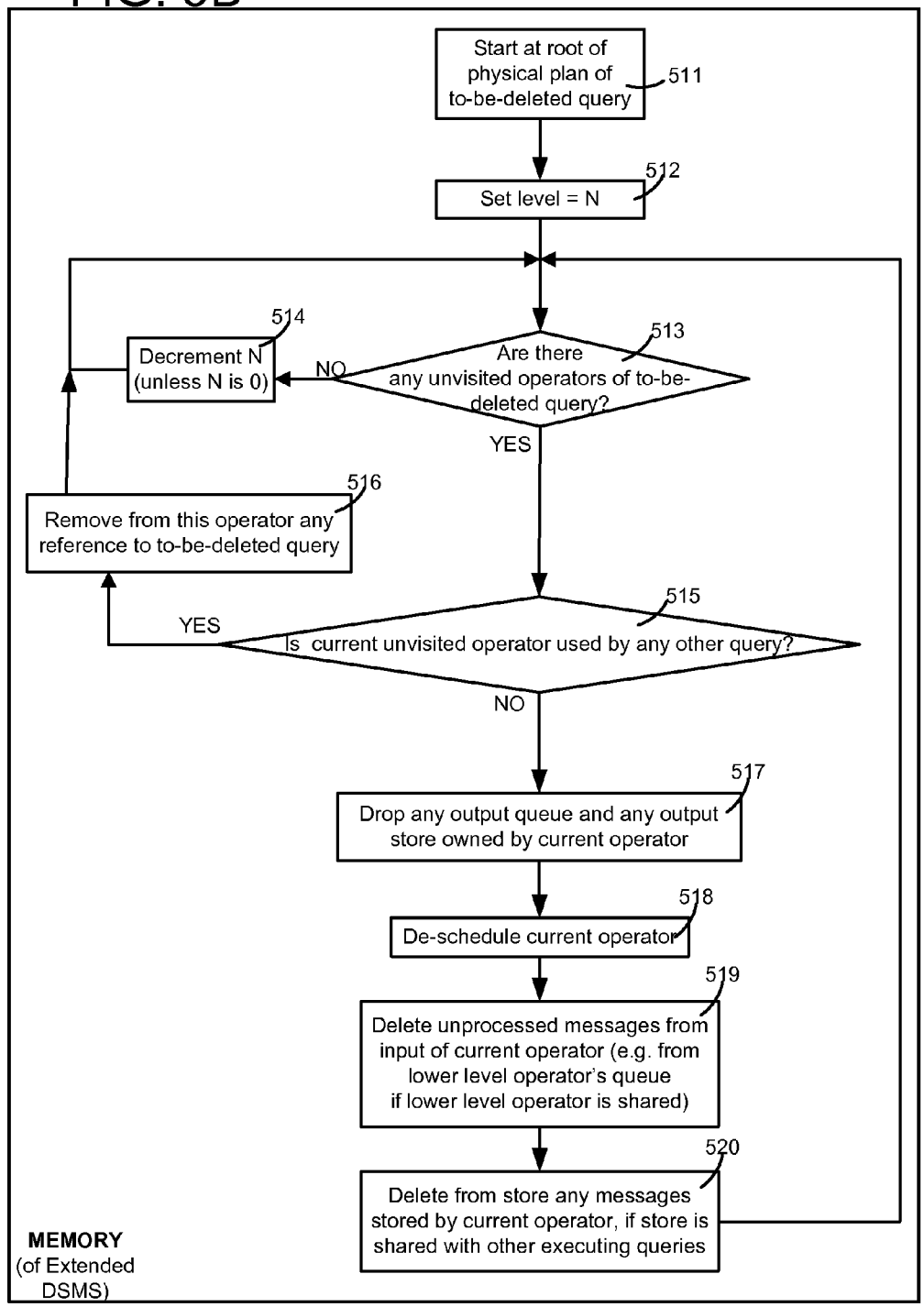

Referring to FIG. 5B, in act 511, the computer starts at the root of a physical plan of a to-be-deleted query and then goes to act 512. In act 512, the computer sets the level to N, and then goes to act 513. In act 513, the computer checks if there are any unvisited operators of the to-be-deleted query. If the result of checking in act 513 is no then the computer goes to act 514 and decrements N (unless N is zero) and then returns to act 513. If the result of checking in act 513 is yes, then the computer goes to act 515. In act 515, the computer checks if the current unvisited operator is used by any other query. If the result of checking in act 515 is yes, then the computer goes to act 516. In act 516, the computer removes from this operator any reference to a to-be-deleted query and then returns to act 513. If the result in act 515 is no, then the computer goes to act 517.

In act 517, the computer drops any output queue and any output store that are owned by the current operator. Next, in act 518, the computer de-schedules the current operator. Thereafter, in act 519, the computer deletes unprocessed messages from the input of the current operator (e.g. from a lower level operator's queue if the lower level operator is shared). Next, in act 520, the computer deletes from the store any messages that are stored by the current operator, if the store is shared with other executing queries. After act 520, the computer returns to act 513. In act 514 if N is 0, then the method of FIG. 5B is completed and the computer returns to FIG. 5A (to operation 503 or to act 507 as appropriate).

Prior to deletion of a query, the query must exist in extended DSMS 200. In some embodiments, the query that is being deleted exists because it was added as one among a number of queries all of which were added at once when extended DSMS 200 started up. However, addition of a query may also be done in an on-line manner, e.g. during execution of extended DSMS 200, if query compiler 210 is suitably programmed. Note, however, that on-line query addition is not required to practice the invention of query deletion as discussed herein. Specifically, the inventors of the current patent application believe that embodiments of the type described herein are effective in deleting a query, regardless of the specific manner in which the query was added.

Note that the extended data stream management system 200 may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 that is being output by computer system 600. An example of data stream 231 is a continuous display of stock quotes, e.g. in a horizontal stripe at the bottom of display 612. In an example of query deletion, a stream of stock quotes changes, for example, on deletion of query on a stock previously of interest, display 612 no longer displays information on the stock previously of interest while continuing to display all other stocks' quotes in the same manner as before deletion of the query. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another computer-readable medium, such as storage device 610. Execution of instructions contained in main memory 606 causes processor 604 to perform the process steps described herein. In alternative embodiments, hard-wired circuitry may be used in place of or in combination with software instructions to implement an embodiment of the type illustrated in FIGS. 5A-5C. Thus, embodiments of the invention are not limited to any specific combination of hardware circuitry and software.

The term "computer-readable storage medium" as used herein refers to any storage medium that participates in providing instructions to processor 604 for execution. Such a medium may take many forms, including but not limited to, non-volatile storage media, and volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter, or any other storage medium from which a computer can read.

Various forms of computer readable storage media may be involved in carrying the above-described instructions to processor 604 to implement an embodiment of the type illustrated in FIGS. 5A and 5B. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a code bundle through Internet 628, ISP 626, local network 622 and communication interface 618. In accordance with the invention, one such downloaded set of instructions implements an embodiment of the type illustrated in FIGS. 5A and 5B. The received set of instructions may be executed by processor 604 as received, and/or stored in storage device 610, or other non-volatile storage for later execution. In this manner, computer system 600 may obtain the instructions in the form of a carrier wave.

Numerous modifications and adaptations of the embodiments described herein will be apparent to the skilled artisan in view of this current disclosure. Accordingly numerous such modifications and adaptations are encompassed by the attached claims.

What is claimed is:

1. A computer-implemented method of processing streams of data using continuous queries, the method comprising:

receiving an instruction to delete a first continuous query;
deleting a second continuous query on which is built a view referenced by the first continuous query, if said view is not referenced by any continuous query other than the first continuous query;
compiling by a computer the second continuous query, in response to said deleting; and
updating said view to refer to a newly-compiled version of the second continuous query, in response to said compiling;
if a predetermined condition is met:
de-scheduling execution of an operator used by the first continuous query;
freeing any resource owned by the operator; and
deleting input data still to be processed by the operator if a queue, holding the input data, is shared with another operator, and alternatively marking the queue for deletion if the queue is not shared.

2. The method of claim 1 further comprising:
recursively performing said deleting, said compiling and said updating with another continuous query on which is built another view referenced by the second continuous query, if said another view is referenced by none other than said second continuous query and said first continuous query.

3. The method of claim 1 further comprising:
returning if an output of the first continuous query is used by a view.

4. The method of claim 1 further comprising:
deleting output data generated by the first continuous query, from a store if an owner of the store is shared by other queries and alternatively marking said store for deletion if the store is not shared.

5. A computer-readable storage medium encoded with instructions to process streams of data using continuous queries, the instructions comprising:
instructions to receive an identity of a first continuous query to be deleted;
instructions to check if an output of the first continuous query is used by any view among a predetermined plurality of views, thereby to obtain a first result;
instructions to check if the first continuous query receives input from any view among the predetermined plurality, thereby to obtain a second result;
instructions responsive to each of the first result and second result being false, to further check if an operator used by the first continuous query is also used by any other continuous query, thereby to obtain a third result; and
instructions responsive to the third result being true, to remove any reference to the first continuous query from the operator;
instructions responsive to the third result being false, to de-schedule execution of the operator, to drop any output queue of the operator, and to drop any store of the operator;
instructions to delete input data still to be processed by the operator if a first queue, holding the input data, is shared with another operator and alternatively to mark the first queue for deletion if the first queue is not shared; and
instructions to delete output data generated by the first continuous query, from a store if an owner of the store is shared by other queries and alternatively to mark said store for deletion if the store is not shared.

6. The computer-readable storage medium of claim 5 further comprising:
instructions responsive to the first result being true, to return without changing execution of the first continuous query.

7. The computer-readable storage medium of claim 5 further comprising:
instructions responsive to the second result being true, to check if the view from which the first continuous query receives input is also referenced by any other continuous query not to be deleted, to obtain a fourth result;
instructions responsive to the fourth result being false to delete a second continuous query used in said view;
instructions to compile the second continuous query again, after said deleting; and
instructions to update said view to refer to a compiled version of the second continuous query resulting from said compiling.

8. The computer-readable storage medium of claim 7 further comprising: instructions responsive to the fourth result being true, to repeat execution of said instructions to check to obtain the second result.

9. A data stream management system comprising a computer and a memory, said data stream management system comprising:
means for receiving an instruction to delete a first continuous query;
means, coupled to the means for receiving, for returning without changing execution of the first continuous query if an output of the first continuous query is used by any view among a predetermined plurality of views;
means, coupled to the means for receiving, for deleting a second continuous query used in a view referenced by the first continuous query if the first continuous query receives input from said view, compiling the second continuous query after deletion, and updating said view to refer to a compiled version of the second continuous query resulting from compilation; and
means, coupled to the means for receiving, for de-scheduling execution of an operator in the first continuous query, dropping any output queue owned by the operator, dropping any store owned by the operator, deleting input data still to be processed by the operator if a first queue holding the input data is shared with another operator and alternatively marking the first queue for deletion if the first queue is not shared, and deleting output data generated by the first continuous query from a store if an owner of the store is shared by other queries and alternatively marking said store for deletion if the store is not shared.

10. The data stream management system of claim 9 further comprising:
means for recursively invoking said means for deleting, compiling and updating with another continuous query on which is built another view referenced by the second continuous query, if said another view is referenced by none other than said second continuous query and said first continuous query.

* * * * *